July 8, 1930. J. D. MORGAN 1,770,362
CLEAR VISION METHOD AND DEVICE FOR MOTOR VEHICLES
Filed May 1, 1926

INVENTOR.
John D. Morgan

Patented July 8, 1930

1,770,362

UNITED STATES PATENT OFFICE

JOHN D. MORGAN, OF SUMMIT, NEW JERSEY

CLEAR-VISION METHOD AND DEVICE FOR MOTOR VEHICLES

Application filed May 1, 1926. Serial No. 105,955.

The invention relates to novel clear vision methods and devices for motor cars, and more especially to such methods and devices, having particular and efficient application to, and cooperation with, the external side of the windshield.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1:
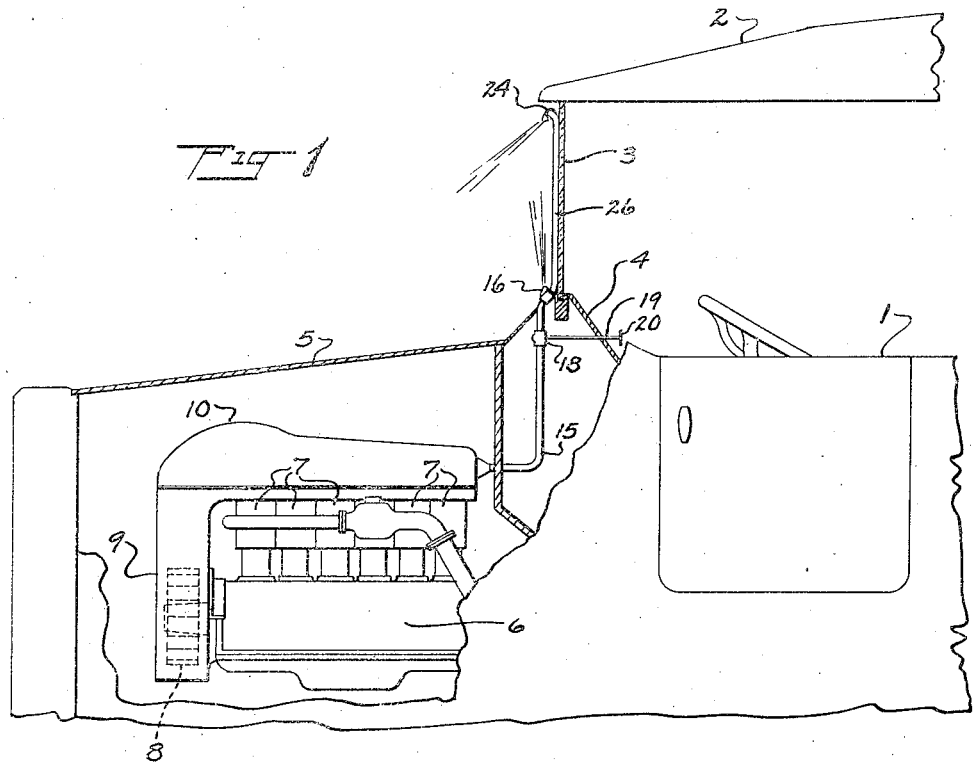
Figure 2:
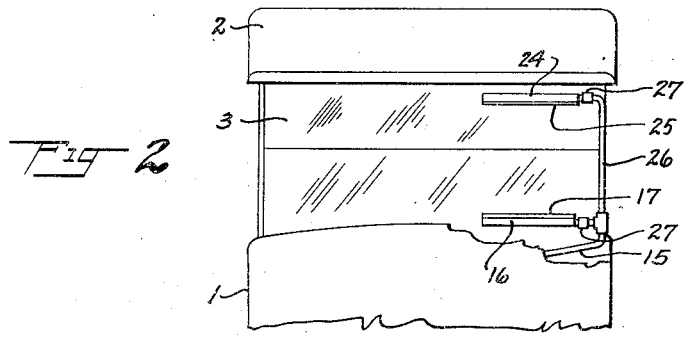

Fig. 1 is a fragmentary elevation, with parts broken away, and parts in section, of a motor car to which the invention is applied; and Fig. 2 is a fragmentary elevation looking at Fig. 1 from the left.

The present invention in certain of its features is directed to utilizing the air pressure and air currents necessarily employed in motor cars having an air-cooled internal combustion engine; but in the other features of the invention it is directed to a cooperation of weather protecting air currents, irrespective of the source thereof or the kind of motor employed.

In so far as concerns the general application of air currents to protect a wind-shield from the deposition of rain and snow, the present invention provides a plurality of sheet-like air currents cooperating together to keep the wind shield free from rain or snow or other obscuring and vision-disturbing agencies. In the preferred embodiment, there is provided broadly a sheet of air directed forwardly, and preferably somewhat downwardly, from the upper part of the exterior of the wind shield on the driver's side, and in conjunction therewith a second sheet-like current of air which is projected across the wind-shield below said first mentioned air current, this second sheet-like air-current being preferably directed upwardly toward the first-mentioned air current.

Another feature of the invention is directed to using the powerful and rapidly-moving air current generated by the powerful fan of an air-cooled internal combustion motor to provide a sheet-like air current or currents for the weather protection of the wind-shield, whether of the form of the precedingly-described air currents or of other form.

It will be understood that the foregoing general description and the appended detailed description or exemplary and explanatory of the invention, but are not unnecessarily restrictive thereof.

Referring now in detail to the embodiment of the invention, illustrated by way of example in the accompanying drawing, the invention is shown applied to a motor car having an air-cooled internal-combustion motor, although as already indicated, certain features of the invention are not necessarily dependent on an air-cooled engine. The motor car is shown provided with a body 1, a top 2, a windshield 3, and a dash 4, which may be of usual type. A hood 5 encloses the engine 6. The engine shown is a six-cylinder engine of the air-cooled type now used in the "Franklin" car, the cylinders being indicated by the reference numeral 7. The powerful and rapidly-moving air current which is utilized for cooling the cylinders is created by a fan 8, enclosed in a housing 9, which discharges into a conduit 10. This conduit extends over the cylinders and distributes the air current to the various cylinders to cool them, in a well-known manner.

By my present invention, I connect with the air-cooling system, and conveniently with the rear part of the conduit 10, a pipe 15, the pipe 15 passing inwardly and upwardly to the windshield 3. At the windshield 3, the pipe communicates with an elongated head 16, provided with a longitudinally-disposed, narrow, air-discharging slot 17, through which a current of air may be discharged. I have shown this device at the bottom part of the windshield on the driver's side, but it is quite obvious that its location might be changed should this be found more advantageous or efficient in certain instances. For general use, however, it is preferred to have the device located substantially as shown. By means of this device a powerful sheet-like air blast from the fan 8 is discharged across the exterior of the windshield.

Means are provided by the invention for turning the weather-protection device on and off, and this is operated from inside the car. The details thereof may be widely varied, but as shown and as at present preferred, a valve 18 is provided in the pipe 15, and having a stem 19 and a hand-wheel 20, conveniently located on the dash within the car. By manipulating the hand-wheel 20, not only may the protecting air sheet be turned on or off, but the intensity of the air action may be varied as desired. If it is desired to heat the air further, the pipe 15 may be placed in contact with any of the hot parts or members of the engine.

Referring now to the feature of the invention whereby a plurality of cooperating air currents are employed as a weather protection from the wind shield, irrespective of the source of the air currents, means are provided, located at the upper part of the wind shield, for directing a sheet of air forwardly from the outer face of the wind-shield 3, and also preferably downwardly, but at a relatively large angle to the windshield. As shown, an elongated head 24 is provided, having a longitudinally-disposed narrow exit slot 25. The head 24 communicates by a pipe 26 with the pipe 15 on the upper or outside of the valve 18. The head 24 can be angularly turned or adjusted on its pipe 26, as by a threaded union 27, to vary the angle of projection of the sheet of air issuing from the slot 25. This may be found useful or desirable in different weather conditions, such as the direction or force of a storm, or for different speeds of the car.

In the preferred form of the invention, I employ the two cooperating sheets of air, namely, that just described, and another sheet of air traveling across the outside of the windshield, and preferably in an upwardly direction, such as would be created or produced by the head 16 and its slot 17. The cooperation of these two sheets of rapidly moving air provide a very complete and efficient protection to prevent the deposition of rain or snow upon the wind shield.

The invention in its broader aspects is not limited to the specific mechanisms shown and described but departures may be made therefrom within the scope of the accompanying claims without departing from the principles of the invention and without sacrificing its chief advantages.

What I claim is:—

1. In a motor car having a windshield, in combination, means for creating an air current, means for directing superposed layers of vertically moving air across said windshield in opposite directions, and means for varying the angular relation between said layers.

2. In a motor car having a windshield, in combination, means for creating an air current, means for directing superposed layers of air across said windshield in opposite directions, and means for varying the angular relation between said layers.

3. In a motor car having a windshield and in combination, means for creating an air current, means for directing a sheet of air downwardly and outwardly in front of the windshield and means for directing a cooperating sheet of air in a different direction and into impingment with said first sheet of air.

4. In a motor car having a windshield and in combination means for creating an air current, means for directing a sheet of air downwardly and outwardly in front of the windshield and means for directing a cooperating sheet of air upwardly and forwardly in front of the windshield.

5. A weather protector for a motor car windshield including in combination means for creating an air current, means for projecting a sheet like current of air across, and exteriorly to, the windshield, and means for varying the direction of travel of said projected sheet like current of air.

6. A weather protector for a motor car windshield including in combination means for creating an air current, means for projecting a plurality of sheet like currents of air in different directions in front of the windshield and means for varying the directions of said sheet like air currents with respect to each other.

7. In a motor car having a windshield and in combination, means for creating an air current, means for confining the air current and directing it over part of the heated motor, means for directing a sheet of the warmed air downwardly and outwardly in front of the windshield, and means for directing a sheet of the warmed air in a different direction and into impingment with said first sheet of air.

In testimony whereof, I have signed my name to this specification.

JOHN D. MORGAN.